(12) United States Patent
Price

(10) Patent No.: US 8,640,599 B2
(45) Date of Patent: Feb. 4, 2014

(54) BRAKE BOOSTER HAVING ATMOSPHERE CHAMBER VOID OF SPRINGS

(75) Inventor: Darryl C. Price, South Bend, IN (US)

(73) Assignee: Robert Bosch GmbH, Stuttgart (DE)

( * ) Notice: Subject to any disclaimer, the term of this patent is extended or adjusted under 35 U.S.C. 154(b) by 880 days.

(21) Appl. No.: 12/815,792

(22) Filed: Jun. 15, 2010

(65) Prior Publication Data

US 2011/0303083 A1    Dec. 15, 2011

(51) Int. Cl.
*B60T 13/57*    (2006.01)
*B60T 13/72*    (2006.01)

(52) U.S. Cl.
USPC .......................................... 91/376 R; 91/377

(58) Field of Classification Search
USPC ................................ 91/376 R, 377
See application file for complete search history.

(56) References Cited

U.S. PATENT DOCUMENTS

| | | | |
|---|---|---|---|
| 3,279,327 A * | 10/1966 | French | 91/376 R |
| 4,598,548 A * | 7/1986 | Wagner | 91/369.2 |
| 4,898,073 A | 2/1990 | Seip et al. | |
| 5,096,267 A | 3/1992 | Volz | |
| 6,044,749 A * | 4/2000 | Bacardit | 91/376 R |
| 6,209,442 B1 * | 4/2001 | Haerr et al. | 91/377 |
| 6,883,415 B2 * | 4/2005 | Kawasumi et al. | 91/376 R |
| 7,063,001 B2 * | 6/2006 | Maligne et al. | 91/376 R |

* cited by examiner

*Primary Examiner* — Thomas E Lazo
(74) *Attorney, Agent, or Firm* — Maginot, Moore & Beck

(57) ABSTRACT

A brake booster includes an atmosphere chamber, a working chamber, a valve assembly, and an air passageway. The atmosphere chamber includes an air inlet, and the working chamber is in fluid communication with the atmosphere chamber. The valve assembly is positioned between the atmosphere chamber and the working chamber, and the valve assembly includes a plunger configured to cooperate with a valve seat to selectively enable or prevent fluid flow from the atmosphere chamber to the working chamber. The air passageway is defined within the atmosphere chamber between the air inlet and the valve assembly. The air passageway is void of any springs.

20 Claims, 2 Drawing Sheets

BRAKE BOOSTER HAVING ATMOSPHERE CHAMBER VOID OF SPRINGS

FIELD OF THE INVENTION

The present disclosure generally relates to braking systems, and in particular to a pneumatic brake booster for a braking system.

BACKGROUND OF RELATED ART

Vehicles often include a hydraulic braking system for reducing the speed of the vehicle and/or maintaining the vehicle in a stopped position. Hydraulic braking systems include a master cylinder fluidly coupled to one or more hydraulic cylinders. The master cylinder includes an input shaft, which activates the hydraulic cylinders in response to the input shaft moving in a braking direction. Typically, a user moves the input shaft in the braking direction by depressing a foot pedal. Each activated hydraulic cylinder moves one or more brake pads against a drum, rotor, or other rotating element to brake the vehicle. Releasing pressure upon the foot pedal, such that the foot pedal moves in a release direction to a deactivated position, causes the input shaft to move in the release direction, which deactivates the hydraulic cylinders and permits the drum, rotor, and/or other rotating elements to rotate freely.

To reduce the force applied to the foot pedal when braking the vehicle, most hydraulic braking systems include a pneumatic brake booster. Some users find that moving a master cylinder input shaft that is coupled directly to a foot pedal requires the user to impart a force upon the foot pedal in excess of that which may be comfortably and repetitively applied. To this end, the pneumatic brake booster amplifies the force exerted on the foot pedal such that the user may move the input shaft of the master cylinder with correspondingly less force being exerted on the foot pedal.

In general, the pneumatic brake booster includes a housing, a valve shaft, a shell, a diaphragm, and a valve. The diaphragm is coupled to the input shaft of the master cylinder, the housing, and the shell. The diaphragm divides an internal cavity of the shell into a booster chamber and a vacuum chamber. The valve separates the booster chamber into an atmosphere chamber and a working chamber. Vacuum generated by a gasoline engine or a vacuum pump is coupled to the vacuum chamber, such that the vacuum chamber is maintained at a pressure less than the atmospheric pressure. The valve shaft, which is coupled to the valve and the brake pedal, is configured to open the valve in response to the brake pedal moving in the braking direction. Biasing members close the valve in response to the brake pedal moving in the release direction.

When the valve is closed, vacuum is supplied to the working chamber, such that the working chamber and the vacuum chamber are maintained at the same pressure level. The approximately equal pressure on each side of the diaphragm causes the diaphragm to remain stationary.

When a user exerts a force upon the brake pedal, the booster amplifies the force, such that the user may move the input shaft of the master cylinder more easily. As described above, exerting a force on the brake pedal causes the valve to open. As a result, air from the atmosphere is drawn through the atmosphere chamber and the valve, and then into the working chamber. The imbalance of pressure between the vacuum chamber and the working chamber tends to move the diaphragm, the valve shaft, the valve, and the input shaft of the master cylinder in the braking direction. Accordingly, the imbalance of pressure amplifies the force exerted on the brake pedal, thereby making the braking system easier to operate.

As explained above, opening the valve results in airflow between the atmosphere chamber and the working chamber. However, the construction of typical brake boosters includes elements positioned within the atmosphere chamber that may impede the airflow. While such elements are often needed for proper operation of the brake booster, it would be advantageous to provide a brake booster that increases the airflow through the atmosphere chamber, thereby increasing the efficiency of the brake booster.

SUMMARY

In accordance with one embodiment of the present disclosure, there is provided a brake booster comprising an atmosphere chamber, a working chamber, a valve assembly, and an air passageway. The atmosphere chamber includes an air inlet. The working chamber is in fluid communication with the atmosphere chamber. The valve assembly is positioned between the atmosphere chamber and the working chamber. The valve assembly includes a plunger configured to cooperate with a valve seat to selectively enable or prevent fluid flow from the atmosphere chamber to the working chamber. The air passageway is defined within the atmosphere chamber between the air inlet and the valve assembly, and the air passageway is void of any springs.

In accordance with another embodiment of the present disclosure, there is provided a pneumatic brake booster for a brake system including a housing, a sleeve, a valve body, a valve plunger, a valve seat, a valve spring, and an atmosphere chamber. The sleeve is positioned within the housing. The valve body is at least partially positioned within the housing and configured to move in a linear direction. The valve plunger is positioned within the housing and configured to move in the linear direction. The valve seat is associated with the sleeve. The valve spring extends between the valve body and the valve plunger and is configured to bias the valve plunger toward the valve seat. The atmosphere chamber is within the housing, is void of springs, and is defined at least in part by the sleeve.

In accordance with yet another embodiment of the present disclosure, there is provided a vacuum brake booster comprising a housing, a valve plunger, a valve rod, a valve body, a sleeve, and an air passage. The housing defines a housing end opening, and the valve plunger is movably located within the housing. The valve rod is coupled to the valve plunger and extends through the housing end opening. The valve body is located within the housing. The sleeve structure is interposed between the housing and the valve rod. The sleeve structure includes a valve seat, which defines a valve opening. The plunger is configured to cooperate with the valve seat to selectively enable or prevent fluid flow through the valve opening. The air passage is free of springs and is defined between the housing end opening and the valve opening. The air passage extends along an inner surface of the sleeve structure.

BRIEF DESCRIPTION OF THE FIGURES

Features of the present disclosure will become apparent to those of ordinary skill in the art to which this device pertains from the following description with reference to the figures, in which.

DETAILED DESCRIPTION

For the purpose of promoting an understanding of the principles of the device described herein, reference will now be made to the embodiment(s) illustrated in the figures and described in the following written specification. It is understood that no limitation to the scope of the device is thereby intended. It is further understood that the device includes any alterations and modifications to the illustrated embodiment(s) and includes further applications of the principles of the device as would normally occur to one of ordinary skill in the art to which this device pertains.

Figure 1:
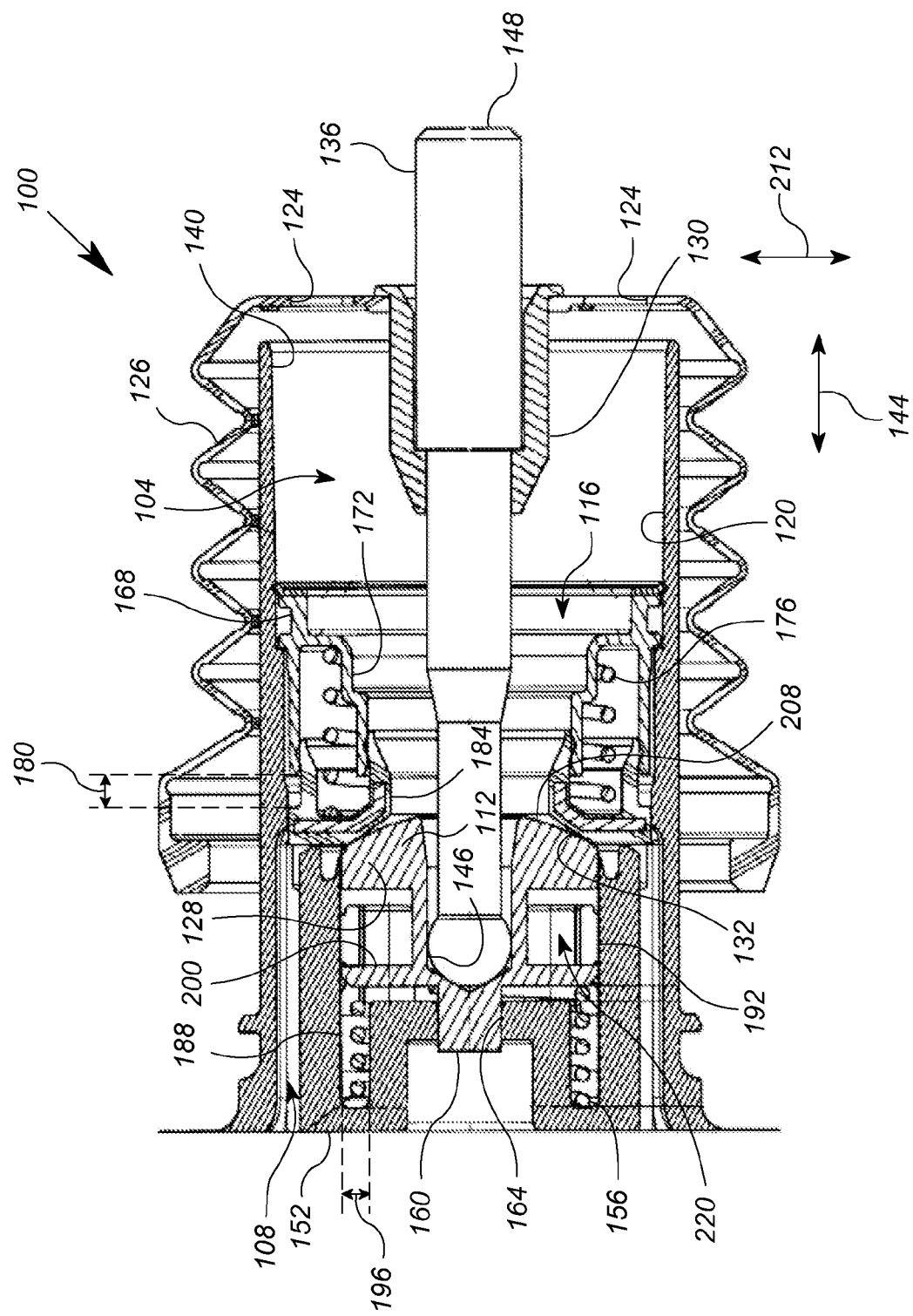
FIG. 1 depicts a cross sectional view of a portion of a brake booster having an atmosphere chamber void of any springs.

As shown in FIG. 1, a pneumatic/vacuum brake booster assembly 100 includes an atmosphere chamber 104, a working chamber 108, a valve assembly 112, and a control rod 136, each of which are at least partially positioned with a housing 120. The valve assembly 112 controls airflow from the atmosphere chamber 104 to the working chamber 108. FIG. 1 depicts the valve assembly 112 in a closed position in which the valve assembly 112 prevents airflow from the atmosphere chamber 104 to the working chamber 108. Leftward movement of the rod 136 opens the valve assembly 112 and enables airflow from the atmosphere chamber 104 to the working chamber 108. The atmosphere chamber 104 is void of springs and other obstructions that may impede the airflow.

The atmosphere chamber 104 is a chamber exposed to the atmosphere surrounding the booster 100. In the embodiment of FIG. 1, the atmosphere chamber 104 is defined at least in part by the housing 120, a sleeve assembly 168, a housing boot 126, and the valve assembly 112. The atmosphere chamber 104 extends from an input side of the housing 120 (opposite the valve assembly 112), through the sleeve 168, and to the valve assembly 112. The atmosphere chamber 104 fluidly communicates with the working chamber 108 in response to the valve assembly 112 being in the open position. While the atmosphere chamber 104 has been described in the embodiment of FIG. 1 as being defined by the housing 120, the sleeve assembly 168, the housing boot 126, and the valve assembly 112, it should be recognized that in other embodiments the atmosphere chamber 104 may be defined by fewer or more components than those described above and those illustrated in FIG. 1.

With reference still to FIG. 1, the housing 120 defines an internal cavity, which is divided into the working chamber 108 and the atmosphere chamber 104 by the valve assembly 112. In some embodiments, the housing 120 moves in a linear direction 144 in response to movement of a diaphragm (not shown) of the booster 100, as is known to those of ordinary skill in the art. The input side of the housing 120 defines a housing end opening 140 through which the negative pressure of the working chamber 108 draws air from the atmosphere surrounding the booster 100 in response to opening the valve assembly 112.

Figure 2:
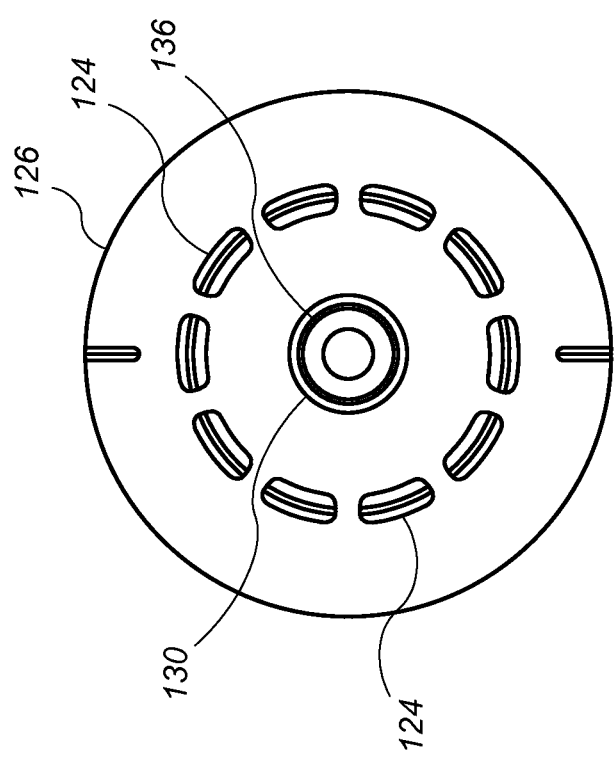
FIG. 2 depicts an end view of the brake booster of FIG. 1.

The housing boot 126 surrounds at least a portion of the housing 120. As shown in FIG. 2, inlets 124 formed in the boot 126 couple the atmosphere chamber 104 to the atmosphere surrounding the booster 100. With reference again to FIG. 1, the housing boot 126 includes a grommet 130 through which the rod 136 extends. The housing boot 126 may be formed from a flexible material, which enables the boot 126 to conform to the position of the housing 120 and the rod 136.

The sleeve assembly 168, which surrounds a portion of the rod 136, includes a tapered section 172, a valve seat 132, and a seat spring 176. The tapered section 172 engages an inner wall of the housing 120 and remains stationary relative to the housing 120. The valve seat 132 moves in the linear direction 144 relative to the housing 120 for the distance 180. The seat spring 176, which is a compression spring, biases the valve seat 132 toward a plunger 128 of the valve assembly 112, as described below.

The atmosphere chamber 104 defines an air passageway 116, which extends between the housing end opening 140 and the valve assembly 112. As shown in FIG. 1, the air passageway 116 may extend along an inner surface of the sleeve 168. In particular, the tapered section 172 tapers the air passageway 116 from a wide region nearest the inlets 124 to a narrow region nearest the valve assembly 112. Similar to the atmosphere chamber 104, the air passageway 116 is void of any springs that impede the airflow through the air passageway 116.

With continued reference to FIG. 1, the working chamber 108 is a chamber separated from the atmosphere chamber 104 by the valve assembly 112. In the embodiment of FIG. 1, the working chamber 108 is defined at least in part by the valve assembly 112, the housing 120, and the sleeve assembly 168. The working chamber 108 extends leftward from the valve assembly 112. When valve assembly 112 is closed, the working chamber 108 may be coupled to a vacuum source (not shown). When the valve assembly 112 is open, air from the atmosphere enters the working chamber 108 and acts upon the diaphragm (not shown) of the booster 100 in order to reduce a force required to activate a hydraulic braking system (not shown). While the working chamber 108 has been described in the embodiment of FIG. 1 as being defined by the valve assembly 112, the housing 120, and the sleeve assembly 168 it should be recognized that in other embodiments the working chamber 108 may be defined by fewer or more components than those described above and those illustrated in FIG. 1.

The valve assembly 112 is positioned between the atmosphere chamber 104 and the working chamber 108, and controls airflow from the atmosphere chamber 104 to the working chamber 108. The valve assembly 112 includes a valve body 152, a plunger 128, a valve seat 132, and a return spring 156. The valve body 152 is at least partially positioned in the working chamber 108 of the housing 120. The valve body 152 moves in the linear direction 144 in response, to among other factors, movement of the rod 136 and the plunger 128. The return spring 156 biases the plunger 128 toward the sleeve assembly 168. The valve body 152 may contact the valve seat 132 in response to the valve assembly 112 being in the closed position.

As shown in the embodiment of FIG. 1, the valve body 152 includes a spring channel 188, a plunger slot 192, and a plunger opening 164. The spring channel 188 communicates fluidly with the plunger slot 192 and receives the return spring 156. A width 196 of the spring channel 188 enables the return spring 156 to move in the linear direction 144. The spring channel 188 surrounds the plunger opening 164, which extends through the valve body 152. The plunger slot 192 receives the plunger 128 and enables the plunger 128 to move in linear direction 144.

The plunger 128 cooperates with the valve seat 132 to enable or prevent airflow from the atmosphere chamber 104 to the working chamber 108. In response to the valve assembly 112 being in the closed position, the plunger 128 contacts the valve seat 132 to prevent airflow into the working chamber 108 from the atmosphere chamber 104. As shown in FIG. 1, the plunger 128 includes a protuberance 160, a flange 200, a cavity 204, and a head 208. The protuberance 160 extends through the plunger opening 164 in the valve body 152. The protuberance 160 aligns the plunger 128 with the valve seat 132, among other functions. The flange 200 is positioned between the protuberance 160 and the head 208 as measured in the linear direction 144. The flange 200 may contact the plunger slot 192 as the plunger 128 slides within the valve body 152. The head 208 contacts the valve seat 132 to decouple the working chamber 108 from the atmosphere chamber 104. A width of the flange 200 and a width of the head 208 as measured in a direction 212 is approximately the same as a width of the plunger slot 192 as measured in the direction 212. The head 208 includes a domed surface, which extends toward the sleeve assembly 168. The domed surface may be received by a corresponding shaped depression in the valve seat 132. The cavity 204 is formed in the center of the plunger 128 and extends from the head 208 to the protuberance 160 in the linear direction 144. A width of the cavity 204 in the direction 212 exceeds a width of the rod in the direction 212. Furthermore, it is noted that the plunger 128 defines a ring shaped void 220 between the flange 200 and the head 208.

The return spring 156 biases the plunger 128 in a direction that closes the valve assembly 112, e.g. rightward as shown in FIG. 1. The return spring 156 extends between the valve body 152 and the plunger 128 and is positioned within the working chamber 108. In particular, the return spring 156 is positioned in the spring channel 188 of the valve body 152. Depending on the position of the plunger 128, the return spring 156 may be located entirely within the spring channel 188; alternatively, a portion of the return spring 156 may be located within the plunger slot 192. The return spring 156 biases the plunger 128 toward the valve seat 132 and away from the valve body 152 to close the valve assembly 112. The valve spring 156 is a compression spring.

The valve seat 132, which may be described as being a portion of the sleeve assembly 168 or a portion of the valve assembly 112, cooperates with the plunger 128 and/or the valve body 152 to fluidly decouple the working chamber 108 from the atmosphere chamber 104. Accordingly, the valve seat 132 may include an elastomer gasket (not shown) or other member, which forms an airtight junction when in contact with the plunger 128 and/or the valve body 152. The valve seat 132 defines an opening 184 through which the airflow passes when the valve assembly 112 is in the open position. The seat spring 176 biases the valve seat 132 toward the plunger 128 and the valve body 152.

The rod 136 transfers the braking force to the valve assembly 112. The rod 136 extends through the grommet 130, the housing end opening 140, the atmosphere chamber 104, and the opening 184, and into the working chamber 108. The plunger 128 receives a ball end 146 of the rod 136 within the cavity 204, and a pedal end 148 of the rod 136 is coupled to a brake pedal of a vehicle (not shown) to receive the braking force. In response to receiving the braking force, the rod 136 moves leftward in the linear direction 144.

In operation, the booster 100 enables an unobstructed airflow to pass through the atmosphere chamber 104 and the valve opening 184. In particular, due to the placement of the return spring 156, airflow through the atmosphere chamber 104 is unimpeded by springs and/or other elements, except for the rod 136. In comparison, some known boosters, include a return spring extending between the housing and the rod within the atmosphere chamber. In response to receiving the braking force, the return spring compresses, thereby causing the coils of the return spring to become positioned nearer to each other. The compacted arrangement of coils may, in some circumstances, restrict airflow through the atmosphere chamber. The booster of FIG. 1, however, includes the return spring 156 positioned behind the plunger 128 in the working chamber 108, such that the airflow through the atmosphere chamber 104 remains unrestricted, even when the return spring 156 is under compression. The unobstructed airflow through the atmosphere chamber 104 may increase the response time of the booster 100, e.g. the unobstructed airflow may cause the hydraulic brakes (not shown) associated with the booster 100 to become activated more quickly than compared to a booster having an airflow obstructed by a return spring positioned in the atmosphere chamber.

In response to receiving the braking force, the rod 136 moves the plunger 128 leftward in the linear direction 144, thereby separating the plunger 128 from the valve seat 132 and opening the valve assembly 112. The open valve assembly 112 enables air to enter the working chamber 108 from the atmosphere chamber 104. The pressure of the airflow within the working chamber 108 acts upon the diaphragm (not shown), as is known to those of ordinary skill in the art, and causes the valve body 152 to move leftward in the linear direction 144. In some embodiments, as the valve body 152 moves leftward, the seat spring 176 moves the valve seat 132 leftward for a short distance, thereby temporarily maintaining the valve seat 132 against the valve body 152. Continued movement of the valve body 152, however, separates the valve body 152 from the valve seat 132 and enables additional airflow through the opening 184.

The valve assembly 112 closes in response to the elimination of the braking force. After the braking force upon the rod 136 subsides, the return spring 156 biases the plunger 128 and the rod 136 rightward in the linear direction 144. Similarly, a valve body spring (not shown) biases the valve body 152 toward the valve seat 132. The valve body 152, under the biasing force of the valve body spring, may contact and move the valve seat 132 rightward relative to the tapered section 172 against the biasing force of the seat spring 176. The return spring 156 biases the plunger 128 against the valve seat 132. Once the plunger 128 and the valve body 152 are biased against the valve seat 132, the airflow through the opening 184 ceases.

The device described herein has been illustrated and described in detail in the figures and foregoing description, the same should be considered as illustrative and unrestrictive in character. It is understood that only the preferred embodiments have been presented and that all changes, modifications, and further applications that come within the spirit of the device described herein are desired to be protected.

What is claimed is:
1. A brake booster comprising:
an atmosphere chamber having an air inlet;
a working chamber in fluid communication with the atmosphere chamber;
a valve assembly positioned between the atmosphere chamber and the working chamber, the valve assembly including a plunger configured to cooperate with a valve seat to selectively enable or prevent fluid flow from the atmosphere chamber to the working chamber, the valve seat defining a valve opening;
a sleeve at least partially positioned in the atmosphere chamber, the sleeve defining a sleeve opening;
an air passageway defined within the atmosphere chamber between the air inlet and the valve assembly, the air passageway extending through the sleeve opening and the valve opening; and
a rod positioned in the air passageway and extending through the sleeve opening and the valve opening,
wherein the movement of the rod causes movement of the plunger, and
wherein the air passageway is void of any springs.

2. The brake booster of claim 1, wherein:
the rod is coupled to the plunger,
the rod is configured to move in a linear direction, and
the air passageway is substantially void of any obstructions other than the rod.

3. The brake booster of claim 2 wherein the plunger is biased toward the valve seat by a return spring that is positioned within the working chamber.

4. The brake booster of claim 3 wherein the working chamber and the atmosphere chamber are positioned within a brake booster housing.

5. The brake booster of claim 4 wherein the return spring and plunger are at least partially positioned within a valve body that is configured to move in the linear direction.

6. The brake booster of claim 5 wherein the air passageway is at least partially defined by the sleeve.

7. The brake booster of claim 6 wherein the sleeve engages an inner wall of the brake booster housing.

8. The brake booster of claim 7 wherein the sleeve tapers the air passageway from a first position closer to the air inlet to a second position closer to the valve seat.

9. The brake booster of claim 8 wherein:
the sleeve includes a first portion that is fixed to the brake booster housing and a second portion that is moveable relative to the brake booster housing, and
the first portion defines the sleeve opening.

10. The brake booster of claim 9 wherein the second portion of the sleeve is spring biased toward the plunger.

11. A pneumatic brake booster for a brake system, comprising:
a housing;
a sleeve positioned within the housing and defining a sleeve opening;
a valve body at least partially positioned within the housing and configured to move in a linear direction;
a valve plunger positioned within the housing and configured to move in the linear direction;
a valve seat associated with the sleeve, the valve seat defining a valve opening;
a rod positioned within the housing and extending through the sleeve opening and the valve opening, wherein movement of the rod causes movement of the plunger;
a valve spring extending between the valve body and the valve plunger and configured to bias the valve plunger toward the valve seat; and
an atmosphere chamber within the housing that is void of springs, the atmosphere chamber defined at least in part by the sleeve, and an air passageway through the atmosphere chamber extends through the sleeve opening and the valve opening.

12. The pneumatic brake booster of claim 11, wherein the atmosphere chamber extends from an input side of the housing, through the sleeve, and to the valve seat.

13. The pneumatic brake booster of claim 11, wherein the atmosphere chamber is configured such that:
air enters the atmosphere chamber and flows through the valve seat in response to the valve member being separated from the valve seat, and air flowing through the atmosphere chamber is unimpeded by springs.

14. The pneumatic brake booster of claim 11 further comprising a seat spring extending between the sleeve and the valve seat and configured to bias the valve seat toward the valve plunger.

15. The pneumatic brake booster of claim 11 wherein the rod extends through the atmosphere chamber and is coupled to the plunger.

16. A vacuum brake booster comprising:
a housing defining a housing end opening;
a valve plunger movably located within the housing;
a valve body located within the housing;
a sleeve structure interposed between the housing and the valve rod, the sleeve structure defining a sleeve opening and including a valve seat, which defines a valve opening, the plunger configured to cooperate with the valve seat to selectively enable or prevent fluid flow through the valve opening;
an air passageway that is free of springs defined between the housing end opening and the valve opening, the air passageway extending along an inner surface of the sleeve structure through the sleeve opening and the valve opening; and
a valve rod extending through the housing end opening, the sleeve opening, and the valve opening,
wherein movement of the rod causes movement of the plunger,
wherein air enters the air passageway through the housing end opening and flows through the sleeve opening and the valve opening in response to the valve plunger being separated from the valve seat, and
wherein air flowing through the air passageway is unimpeded by springs.

17. The vacuum brake booster of claim 16 further comprising a return spring located between the plunger and the valve body, the return spring configured to bias the plunger and the valve rod away from the valve body.

18. The vacuum brake booster of claim 17, wherein:
the sleeve structure further includes a first portion configured to engage an inner wall of the housing, and
the valve seat is movable relative to the first portion of the sleeve structure.

19. The vacuum brake booster of claim 18 wherein the valve body and the valve plunger contact the valve seat in response to the valve plunger preventing fluid flow through the valve opening.

20. The vacuum brake booster of claim 19 wherein the valve body defines a plunger opening and a protuberance of the valve plunger extends through the plunger opening.

* * * * *